Patented Nov. 14, 1944

2,362,451

UNITED STATES PATENT OFFICE 2,362,451

FERMENTATION PROCESS FOR PRODUCTION OF ETHANOL

Leo M. Christensen, Miller, Nebr., assignor of one-third to Frank L. Robinson, Kearney, Nebr., and one-third to John L. Ledbetter, Jr., Scarsdale, N. Y.

No Drawing. Application September 2, 1941, Serial No. 409,315

2 Claims. (Cl. 195—13)

This invention relates to the production of ethanol from sugars, and more particularly to a fermentation process for the production of ethanol from molasses.

In the past, ethanol has been produced from blackstrap or beet molasses by fermentation of an acidified or pasteurized solution of the molasses with a suitable strain of the yeast Saccharomyces cerevisiae. A relatively poor yield, i. e., averaging about 75% of the theoretical has been obtained and I believe that this low yield is probably due, at least in part, to three factors. In the first place, not all of the sugar present in molasses in sucrose and the presence of unfermentable sugars would, of course, cut down the yield of ethanol. Secondly, there are sometimes present in the molasses sufficient concentrations of certain salts and other materials to be toxic to yeast and therefore a part of the yeast is destroyed before it has had time to convert the sugars present to ethanol. In the third place, it is known that certain nutrients and growth stimulants are needed for the best growth of yeast, and the absence or presence in insufficient amount of these nutrients would undoubtedly reduce the efficiency of the yeast. It is probable that all three factors are operative in most cases, with relative effects varying from one type of molasses to another.

I have found that the addition to a sugar-containing solution, before or during its fermentation with yeast, of an amount of a diastatic mold grown either on a solid substrate or in a liquid medium such as dilute molasses or spent mash from molasses or grain fermentation results in greatly improved yields of ethanol. The fungus Aspergillus oryzae or other diastatic molds such as species of the genera Rhizopus and Mucor on wheat bran, rice, and the like have been found very effective in the process of the present invention, and yields of ethanol as high as 95% of the theoretical are possible.

Mold bran has been used in the past in alcohol fermentations but its use has been confined to processes of fermentating starch-containing materials, where its function is that of a saccharifying agent and the diastatic enzymes present therein convert the starch to sugars fermentable by yeast.

According to the present invention, when mold bran or other diastatic mold on a solid substrate is added to an acidified or pasteurized solution of molasses, the fermentation efficiency is markedly improved when the ratio of mold bran to sugars is at a definite optimum, i. e., about 5 parts by weight mold bran for each 100 parts by weight of sugar. Other ratios are operative, however, and I do not intend to limit the scope of my invention to the definite optimum ratio set out above.

The diastatic mold to be used may be grown on a suitable solid substrate according to any of several known procedures. I have found that excellent results are obtainable with a mold bran prepared as follows: An amount of wheat bran is moistened with an approximately equal weight of water, acidified to a pH of about 4.5, and sterilized by heating. The mixture is cooled, inoculated with spores of Aspergillus oryzae, and then held at a temperature of between about 35° C. and 45° C. for a period of about 24 to 48 hours with sufficient aeration to maintain aerobic conditions and to remove the heat produced by the mold growth and metabolism. This constitutes the preferred embodiment of my invention but satisfactory results may also be obtained by utilizing other diastatic molds such as species of the genera Rhizopus and Mucor on wheat bran or other suitable solid substrate or by utilizing the fungus Aspergillus oryzae on a suitable solid substrate other than wheat bran, the particular method of preparation of the mold bran forming no part of the present invention. Moreover, molds grown in liquid media such as dilute molasses or spent mash from molasses or grain fermentation may be used to advantage.

The invention will be described in greater detail in conjunction with the following specific examples which are illustrative only and I do not wish to be limited to the specific details therein set forth.

Example I

Beet molasses containing by weight 59% of total sugars as sucrose was diluted with water to yield a medium containing 18.3 g. of total sugars as sucrose per 100 cc. of solution. The medium was heated to 100° C. for ten minutes, then cooled to 30° C., and varying amounts of mold bran, prepared as above described, were added. The medium was then inoculated with a 24 hour old culture of *Saccharomyces cerevisiae* grown in a similar medium, the ratio of inoculum being 3 cc. per 100 cc. of medium. The fermentation was continued for 72 hours at a temperature of from 30° C. to 32° C., after which the alcohol was removed by distillation in the usual manner and measured. The results obtained are given in the following table:

| Mold bran | | Ethanol | | |
|---|---|---|---|---|
| G./100 cc. medium | G./100 g. sugars | Per cent of molasses | Per cent of sugars | Per cent of theoretical |
| 0 | 0 | 18.9 | 32.0 | 59.5 |
| 0.08 | 0.44 | 21.8 | 37.0 | 68.8 |
| 0.16 | 0.87 | 25.4 | 43.0 | 79.9 |
| 0.33 | 1.80 | 27.6 | 46.7 | 86.8 |
| 0.50 | 2.73 | 29.1 | 49.5 | 92.0 |
| 0.67 | 3.66 | 29.8 | 50.6 | 94.1 |
| 0.83 | 4.54 | 30.5 | 51.7 | 96.1 |
| 1.00 | 5.46 | 30.3 | 51.2 | 95.2 |
| 1.33 | 7.25 | 30.1 | 51.0 | 94.8 |
| 1.67 | 9.10 | 29.8 | 50.5 | 93.9 |

It will be apparent from the above data that the fermentation efficiency is highest when about 5 g. of the mold bran is used for every 100 g. of sugars, a yield of 96% of the theoretical 53.8% being obtained with 4.54 g. of the mold bran per 100 g. of total sugars as sucrose.

*Example II*

High test molasses, made by evaporating to a syrup cane juices taken from the crushers without removal of any of the sugar and containing about 64.2% total sugars as sucrose, was diluted with water to produce a medium containing 12.8 g. of sugar as sucrose per 100 c. c. of solution. Varying amounts of mold bran were added and the medium inoculated as described in Example I. After 48 hours fermentation at 32° C., the alcohol was removed by distillation and measured in the usual manner with the following results:

| Mold bran | | Ethanol | | |
|---|---|---|---|---|
| G./100 cc. medium | G./100 g. sugars | Per cent of molasses | Per cent of sugars | Per cent of theoretical |
| 0 | 0 | 15.9 | 24.8 | 46.1 |
| 0.05 | 0.39 | 21.1 | 33.0 | 61.3 |
| 0.10 | 0.78 | 23.7 | 37.0 | 68.8 |
| 0.20 | 1.56 | 25.4 | 39.5 | 73.4 |
| 0.30 | 2.34 | 27.5 | 43.0 | 79.9 |
| 0.40 | 3.12 | 28.7 | 44.8 | 83.3 |
| 0.50 | 3.91 | 30.1 | 47.0 | 87.4 |
| 0.60 | 4.70 | 31.3 | 48.8 | 90.7 |
| 0.80 | 6.28 | 31.1 | 48.5 | 90.1 |
| 1.00 | 7.82 | 30.3 | 47.1 | 87.5 |

From the data in the preceding examples it appears that desirable improved yields of ethanol may be obtained when from about 2.5 to 7.5 parts by weight of mold bran are added for every 100 parts by weight of sugar, the maximum yield generally resulting as stated above when the mold bran sugar ratio is about 5:100.

Mold bran additions may also be employed to advantage in the fermentation of other sugar solutions such as refiners' molasses, beet root syrup, artichoke syrup, and the like, with consequent greatly increased yields of ethanol. The optimum mold bran to sugar ratio varies slightly from one sugar-containing material to another, in general being lower with lower sugar concentrations, but in every case the use of about 5 g. of the mold bran to 100 g. of sugar is near enough to the optimum to give substantially maximum ethanol yield.

While I have described the addition of mold bran just prior to inoculation and at a temperature of 30° C., I may add it at any other temperature between about 30° C. and 80° C. and at any time between zero and three hours before inoculation. If the mash stands more than three hours after the mold bran addition before inoculation, some of the benefits of the mold bran addition are generally lost. The mold bran addition may also be effected after inoculation but to secure maximum benefit thereof, the addition should be made within 24 hours of the inoculation.

It is an advantage of the present invention that the rate of fermentation is increased when a mold bran is added. Moreover, higher mash concentrations may be used than can be economically employed without such mold bran addition.

I claim:

1. A process for the production of ethanol comprises adding a mold bran obtained by growing *Aspergillus oryzae* on wheat bran to a molasses solution, about 5 parts by weight of the mold bran being added for every 100 parts by weight of the molasses, inoculating the resulting treated molasses solution with *Saccharomyces cerevisiae* at a temperature of about 30° C. within three hours of the addition of the mold bran, allowing the mixture to ferment for 48 to 72 hours at about 30° C., and removing the ethanol by distillation.

2. A process for the production of ethanol which comprises adding to a molasses solution from about 2.5 to 7.5 parts by weight of a mold bran to every 100 parts by weight of molasses, inoculating the resulting treated molasses solution with a yeast, allowing the mixture to ferment, and removing the ethanol produced.

LEO M. CHRISTENSEN.